United States Patent [19]

Kleinschmidt

[11] 4,198,618
[45] Apr. 15, 1980

[54] CIRCUIT ARRANGEMENT FOR ULTRASONIC BURGLAR SECURITY SYSTEMS OPERATING IN ACCORDANCE WITH THE DOPPLER PRINCIPLE

[75] Inventor: Peter Kleinschmidt, Munich, Fed. Rep. of Germany

[73] Assignee: Siemens Aktiengesellschaft, Berlin & Munich, Fed. Rep. of Germany

[21] Appl. No.: 895,949

[22] Filed: Apr. 13, 1978

[30] Foreign Application Priority Data

May 20, 1977 [DE] Fed. Rep. of Germany ....... 2722982

[51] Int. Cl.$^2$ ............................................. G01S 9/66
[52] U.S. Cl. .................................... 367/94; 343/5 PD
[58] Field of Search .............. 340/3 D, 1 R, 554, 560; 343/5 PD

[56] References Cited

U.S. PATENT DOCUMENTS

| | | | |
|---|---|---|---|
| 3,202,960 | 8/1965 | Galbraith | 340/3 D X |
| 3,631,849 | 1/1972 | Norris | 340/3 D X |
| 4,017,684 | 8/1978 | Watson, Jr. | 343/5 PD X |

*Primary Examiner*—T. H. Tubbesing
*Attorney, Agent, or Firm*—Hill, Van Santen, Steadman, Chiara & Simpson

[57] ABSTRACT

A circuit arrangement for an ultrasonic burglar security system operates in accordance with the Doppler principle and comprises a transmitting transducer which is fed from an oscillator with an ac voltage and continuously transmits ultrasonic radiation during operation, a receiving transducer and a receiving circuit connected thereto and having an analysis circuit and a phase detector which continuously compares the signal received by the receiving transducer with the oscillator ac voltage to form a detection signal which is dependent upon the mutual phase angle. The detection signal is fed to the analysis circuit which responds to the ac component thereof. The circuit arrangement includes a phase-locked loop (PLL) which includes a further detector, a low-pass filter following the phase detector and an oscillator. The oscillator has its frequency controlled at a control input and may be formed as a voltage controlled oscillator (VCO). The cut-off frequency of the low-pass filter is designed to be such that only signals which can pass fundamentally without reduction are those whose frequency is lower than a critical frequency $F_c = c/E$, where c is the speed of sound of the ultrasonic radiation in the area and E is the path of the ultrasonic radiation from the transmitting transducer to a reflective object located in the predetermined maximum range and back to the receiving transducer.

3 Claims, 3 Drawing Figures

CIRCUIT ARRANGEMENT FOR ULTRASONIC BURGLAR SECURITY SYSTEMS OPERATING IN ACCORDANCE WITH THE DOPPLER PRINCIPLE

BACKGROUND OF THE INVENTION

1. Field of the Invention

The present invention relates to a circuit arrangement for an ultrasonic burglar security system operating in accordance with the Doppler principle, and more particularly to such an arrangement which comprises a transmitting transducer which is fed with an ac voltage from an oscillator and which continuously transmits ultrasonic radiation during operation, a receiving transducer and a receiving circuit connected to the receiving transducer and which has an analysis circuit and a phase detector which continuously compares the received signal of the receiving transducer with the ac voltage to form a detection signal which is dependent upon the mutual phase angle and which is fed to the analysis circuit, the analysis circuit responding to the ac component of the detection signal.

2. Description of the Prior Art

The German published application No. 2,613,375 of Oct. 13, 1977, discloses a circuit arrangement of the type generally set forth above. The detector of the circuit arrangement has an amplitude limiter of a type known per se for frequency modulation, which is provided for the received signal and by which the entire amplitude modulation of the received signal is cut off, for which purpose the received signal is previously amplified to such an extent that the signal, which has been entirely cut off in amplitude, still has adequate intensity for further processing. A product detector is supplied with the signal having the limited amplitude and with a reference signal derived from the transmitter, and supplies a frequency difference signal which is available at the output terminal for feeding a device which triggers an alarm.

In special applications, in an ultrasonic burglar security system as described in the aforementioned German published application, it can be necessary to select the exact location at which, in particular, the ultrasonic receiving transducer is set up (or that part of the device containing the receiving transducer) in order to insure that, due to interferences, the ultrasonic transducer does not receive a signal which, for the phase comparison with the signal fed from the oscillator to the phase detector, possesses a phase state which is unfavorable for analysis. This problem can be overcome in a simple manner by a relatively slight, differential change of location of the receiving transducer and/or the transmitting transducer. On the other hand, however, it could also be necessary, in the event of a change in the set-up of the area to be monitored, for example in the event that a cupboard or the like is moved, to carry out a location correction of at least one transducer (or possibly of the transmitting transducer).

SUMMARY OF THE INVENTION

It is therefore an object of the present invention to provide a circuit arrangement for an ultrasonic burglar security system which possesses a design which is improved inasmuch as measures, such as those described above, become superfluous.

This object is achieved with a circuit arrangement of the type generally set forth above in which the circuit arrangement has a phase-locked loop (PLL) which includes a further detector, a low-pass filter connected following the further detector and an oscillator, where the oscillator is an oscillator which can be controlled in respect of its frequency at a control input, and where the cut-off frequency of the low-pass filter is designed such that the only signals which can pass fundamentally unreduced are those whose frequency is lower than a critical frequency $F_c = c/E$, where c is the sound speed of the ultrasonic radiation in the area and E is the path for the ultrasonic radiation from the transmitting transducer to the receiving transducer by way of a reflective object located within the predetermined maximum range.

BRIEF DESCRIPTION OF THE DRAWINGS

Other objects, features and advantages of the invention, it organization, construction and operation will be best understood from the following detailed description, taken in conjunction with the accompanying drawings, on which.

DESCRIPTION OF THE PREFERRED EMBODIMENT

Figure 1:
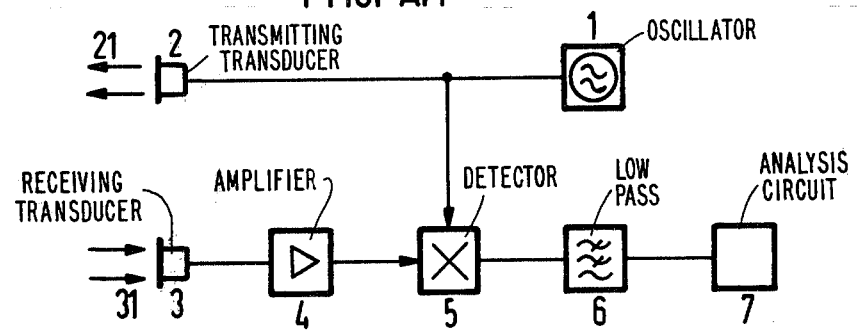
FIG. 1 is a schematic block diagram of a circuit arrangement of the type disclosed in the aforementioned German published application.

The circuit arrangement illustrated in FIG. 1 has an oscillator 1 which supplies an output ac voltage to an ultrasonic transmitting transducer 2. The emitted ultrasonic radiation is referenced 21. Ultrasonic radiation reflected on the walls of the area to be monitored and on objects arranged in this area are schematically indicated at 31. This radiation is received by an ultrasonic receiving transducer 3 and converted into electrical signals. When reflected on stationary objects, the ultrasonic frequencies of the transmitted radiation 21 and the received radiation 31 are identical. In the case of moving objects, however, which are to be detected by the system, the known Doppler frequency shift occurs which is analyzed to trigger an alarm. The electrical signal produced by the receiving transducer 3 is fed to an amplifier 4 and then to a phase detector 5 which is also supplied with a part of the ac voltage of the oscillator 1 of the transmitting component. The phase detector 5 supplies an output signal whose amplitude is dependent upon the phase difference between the oscillator ac voltage of the oscillator 1 and the received signal supplied by the receiving transducer 3. The output signal of the phase detector 5 passes, via a low-pass filter 6, to an analysis circuit 7 in which an alarm signal is emitted in accordance with an ac component of the phase detector signal, namely on the basis of radiation reflected from a moving object.

Equipping a circuit arrangement of the type illustrated in FIG. 1 with a conventional phase detector involves certain difficulties inasmuch as all the known phase detectors do not have constant sensitivity. The detection sensitivity in respect of small phase fluctuations between the supplied signals is dependent upon the degree of the general phase difference between the signals supplied to the phase detector. For specific, periodic values of the phase difference, the sensitivity can even be zero. This can occur when, in a burglar security system or an area protection device, in dependence upon the set-up and properties of the area in question, the received signals can assume any phase which remains uniform over a period of time relative to the transmitting oscillator ac voltage. However, this can be overcome with the aid of the above-mentioned measures which, in particular in the case of changes, can require readjustment.

Figure 2:
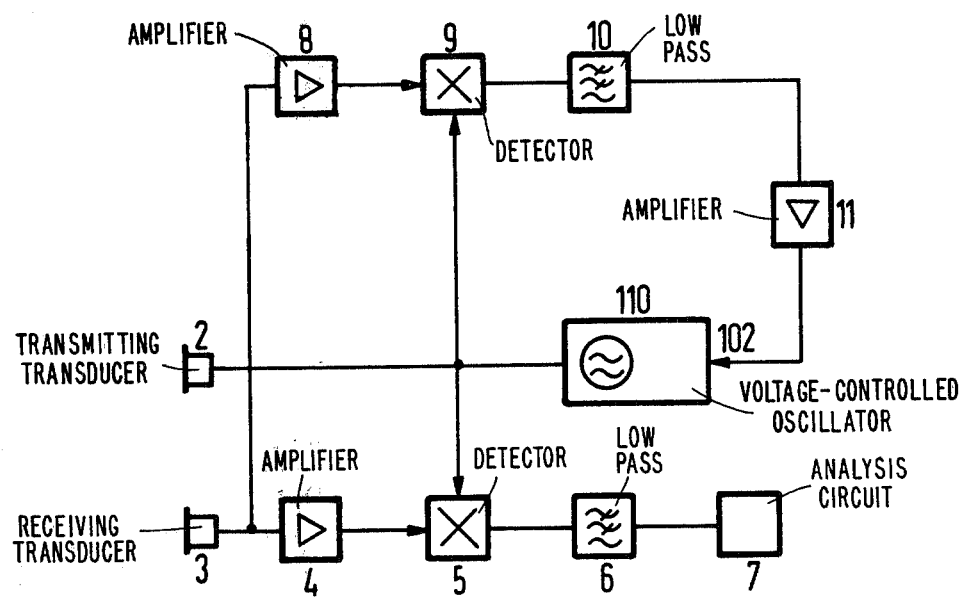
FIG. 2 is a fundamental circuit diagram of a circuit arrangement constructed in accordance with the present invention.

According to a feature of the invention, the circuit arrangement constructed in accordance with the invention and illustrated in FIG. 2 has a phase-locked loop, which is known in the art as a PLL circuit. It includes the elements 9, 10 and 110, and also 11 and 102 in FIG. 2, which will be explained in detail below. The other details of FIG. 2 correspond to the features already explained with reference to FIG. 1 and therefore have been provided with identical reference characters.

In accordance with a further feature of the invention, the oscillator 110, which is controllable with respect to its frequency, although only to a low extent of e.g. ±5%, is provided with a control input 102.

As already described with reference to FIG. 1, the oscillator 110 supplies an ac voltage to the transmitting transducer 2 and to the phase detector 5. However, according to the present invention, a part of the oscillator ac voltage of the oscillator 110 is also fed to a further phase detector 9 which is likewise supplied with with a part of the received signal of the receiving transducer 3. This signal component can be derived following the preliminary amplifier 4 or also directly from the receiving transducer 3 by way of an amplifier 8. The latter embodiment is particularly suitable for situations in which the phase detector includes an amplifier 8.

The output signal of the phase detector 9, which signal is dependent in amplitude upon the phase difference, passes through a low-pass filter 10 which is designed in a manner which will be described below. The output signal from the low-pass filter 10 passes, via further amplifier 11, to the control input 102 of the oscillator 110.

A controllable oscillator 110 as described herein is also referred to as voltage control oscillator (VCO).

The PLL regulating loop formed by the phase detector 9, the low-pass filter 10 and the oscillator 110 allows the frequency of the oscillator 110 to be controlled in dependence upon the phase difference established in the phase detector 9.

The mode of operation of the circuit arrangement constructed in accordance with the present invention, thus far described, is such that the frequency of the oscillator ac voltage is varied in such a manner that, for such time as no objects move in the monitoring zone, a predeterminable, uniform phase angle is established between the transmitting oscillator voltage and the signal received at the transducer 3. According to the selection of the type of phase detector, the phase angle is contrived to be such that a favorable detection action is achieved.

However, for the realization of the object of the present invention, it is also absolutely essential that a received signal of adequate size should always be present in the receiving transducer 3, which is not ensured if, on the reception of reflected signals from stationary objects due to favorable interference conditions of the ultrasonic radiation in the monitoring zone, the receiving signal is so weak that the PLL regulating system comes to a halt. This circumstance is taken into account by a further feature of the invention. In fact, as a result of the special application of the invention, periods of time exist in which received ultrasonic signals occur which are based on reflection from stationary objects. For such time as there is not movement of a reflecting object, the frequency of the received ultrasonic radiation conforms with that of the transmitting oscillator voltage. This means that during this length of time the PLL circuit does not have to carry out regulation so that the low-pass filter 10 provided in the PLL circuit can have an unusually high time constant of, for example, $\tau > 1$. The operating range of the PLL circuit having a low-pass filter 10 of such a low cut-off frequency is now reduced to fractions of 1 Hz, for example. This has no disadvantageous influence on the operating situation in which no movement of objects occurs. On the other hand, this ensures that the phase-rigid regulation in this stationary state influences the oscillator 10 in such a manner that a permanently constant phase deviation of, for example, 90° exists between the received signal and the oscillator signal. Therefore, this fulfills a first condition for a sensitive detection, namely that no phase indetermination should exist in respect of the signals to be analyzed.

Therefore, this high time constant of the low-pass filter 10 fulfills a second condition, namely the avoidance of quenching of intensity on the receiving transducer 3. If, in fact, a situation of this kind should by chance occur, the oscillator 10 would no longer receive a defined control voltage and would change its own oscillator frequency in an uncontrolled fashion. Due to the very high time constant of the PLL circuit, this takes place very slowly, however, i.e. in periods of time which are long relative to the transit time of the ultrasonic radiation in the area to be monitored. In the event of this independent change in frequency of the oscillator 110, changes occur in the interference conditions in the area and there is always one of an arbitrary number of possible new frequencies for the oscillator ac voltage for which a receiving amplitude of adequate magnitude is formed at the receiving transducer 3. As a result, however, the oscillator 110 in the circuit arrangement constructed in accordance with the present invention again automatically enters the phase control. The cut-off frequency which is to be selected for the low-pass filter 10, in accordance with a feature of the invention, is contrived to be such that only signals which can pass fundamentally without reduction are those whose frequency is lower than a critical frequency $F_c = c/E$, where c is the sound speed of the ultrasonic radiation in the area in question, and E is the path of an ultrasonic radiation which has been emitted from the transmitting transducer 2, reflected by an object located at a maximum range and received by the receiving transducer. Calculation of the value E is non-problematic and relatively non-critical. For an ultrasonic burglar security system the area to be monitored is generally known. Therefore, the value E cannot exceed twice the maximum distance in the area in question, with reference to the diagonal of the area. However, this does not impose a limitation to the effect that the range of application of a device constructed in accordance with the invention is subject to a special condition. The value E can readily be selected to be an order of magnitude greater, even up to two orders of magnitude, than the path which subsequently constitutes the maximum path length for ultrasonic radiation in the individual, actual applicaton.

On the other hand, however, the design of a circuit constructed in accordance with the present invention, particularly the low-pass filter 10, differs quite decisively from filter values in PLL circuits normally prevailing in the regulating circuit.

In the event of the reception of frequency-shifted signals which have been reflected from moving objects (a detection situation) the PLL circuit in a circuit arrangement constructed in accordance with the present invention does not always directly operate as such a circuit. The superimposed Doppler frequency modulation of, for example, 40 to 400 Hz is itself too rapid for the inert reaction of the PLL circuit due to the above-described design, i.e. due to the low cut-off frequency of the low-pass filter 10. However, the PLL circuit continues to operate for the average adherence to the phase relationship and even in the event of the detection of a movement, i.e. the presence of a Doppler frequency-shifted received signal, avoids unfavorable general phase states.

It is not, in itself, necessary to discuss the fact that special attention should be given to received signals, those signals prevailing for a longer period of time, which exhibit equal, like-directed Doppler shift. A situation of this kind could, in fact, bring the rigid phase regulation out of lock. Doppler-frequency shifted received singals of this type are, however, always so strong in intensity that a flexible adherence to the phase regulation, in accordance with the present invention, could lead to the breakdown of the detection, as received signals of this kind are always sufficiently strong in intensity.

Figure 3:
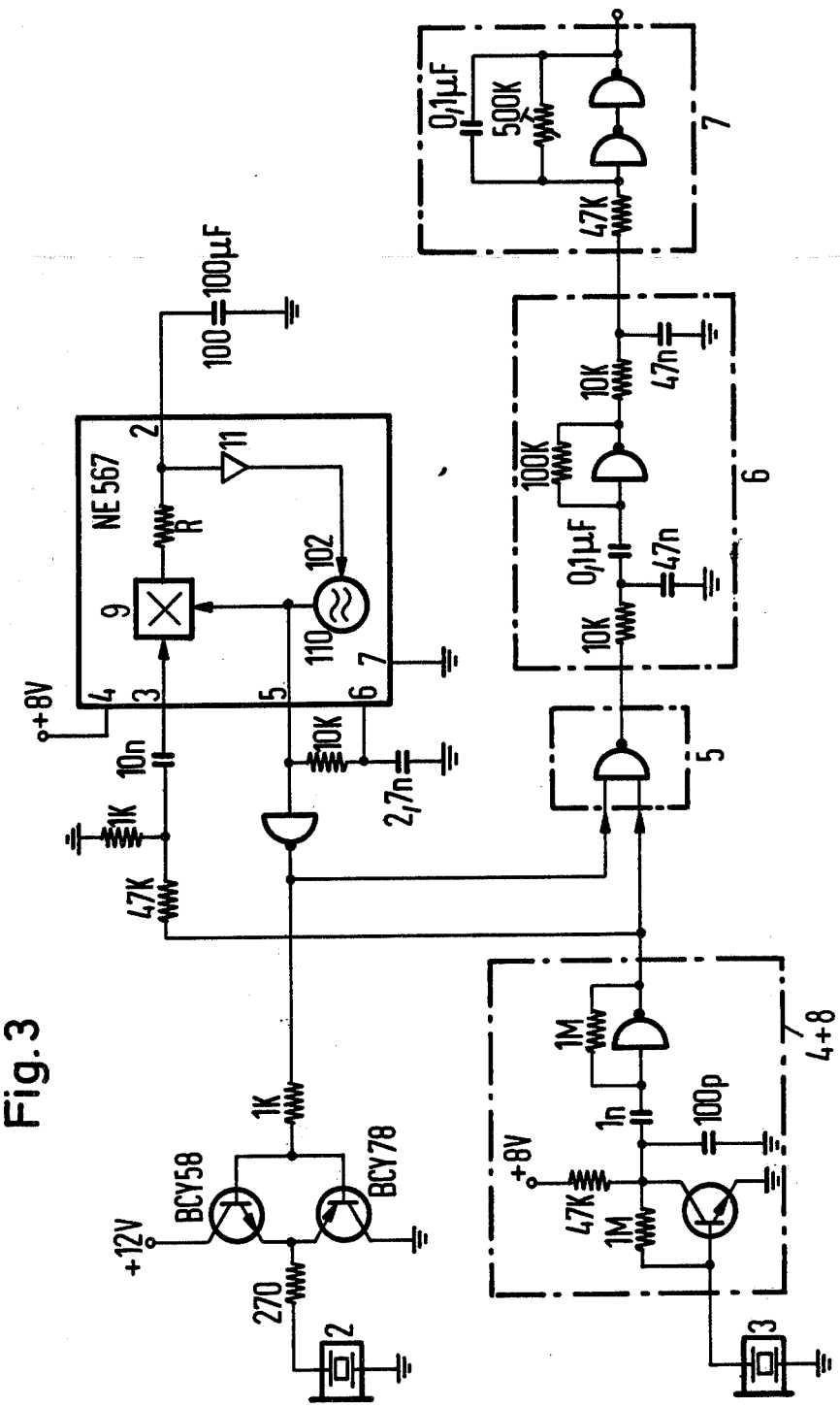
FIG. 3 is a detailed schematic circuit diagram of a preferred embodiment of a circuit arrangement constructed in accordance with the present invention.

FIG. 3 illustrates a complete circuit diagram of an embodiment of a circuit arrangement constructed in accordance with the invention. One skilled in the art will not require any special explanation of this exemplary embodiment. However, an explanation will be given in respect of the use of a commercially available, integrated PLL circuit of the type manufactured by Signetics, known as the tone decoder, type NE 576. The oscillator 110 consists of an oscillator as referenced 1 in FIG. 1 and of the circuit means which can be influenced from the input 102 and serve to control the frequency of the oscillator. This oscillator 110 is contained in an IC circuit together with the amplifier 11 and a resistor of the low-pass filter 10. The capacitor 100 in FIG. 3 serves as a frequency-determining capacitor of the low-pass filter 10 of the PLL circuit. The further phase detector 9 is likewise contained in the IC circuit. The amplifier 8, from the circuit in FIG. 3, and the amplifier 4, from the circuit in FIG. 2, are one and the same amplifier. The phase detector 5 is formed by a logic NAND gate.

Although I have described my invention by reference to a particular illustrative embodiment thereof, many changes and modifications of the invention may become apparent to those skilled in the art without departing from the spirit and scope thereof. I therefore intend to include within the patent warranted hereon all such changes and modifications as may reasonably and properly be included within the scope of my contribution to the art.

I claim:

1. In a circuit arrangement for an ultrasonic burglar alarm system of the type which operates in accordance with the Doppler principle and which comprises a transmitting transducer which is fed an a.c. voltage from an oscillator for continuously transmitting ultrasonic radiation, a receiving transducer for producing a received signal in response to reflected radiation and a receiving circuit including an analysis circuit, a low pass filter and a phase detector which compares the received signal with the a.c. oscillator voltage and forms a detection signal which is dependent on the mutual phase angle and which is fed to the analysis circuit, the improvement therein comprising:

a phase locked loop including a further detector connected to the oscillator and connected to receive the received signal from the receiving transducer and a further low-pass filter connected to said further detector, and wherein the oscillator is a voltage-controlled oscillator connected to and having its frequency controlled by the output of said further low-pass filter, said further low-pass filter including means defining a cut-off frequency such that the only signals which pass, fundamentally without reduction, are those signals having frequencies less than $F_c = c/E$, where c is the speed of the ultrasonic radiation and E is the distance from the transmitting transducer to a reflective object located in the predetermined maximum range of the monitored area and on further to the receiving transducer.

2. The improved circuit arrangement of claim 1, further comprising:

an amplifier connected between the receiving transducer and said further phase detector.

3. The improved circuit arrangement of claim 1, further comprising:

an amplifier connected to the receiving transducer, on the one hand, and, on the other hand, to both of the phase detectors.

* * * * *